(12) United States Patent
Morales et al.

(10) Patent No.: US 11,748,222 B2
(45) Date of Patent: Sep. 5, 2023

(54) HEALTH MEASUREMENT AND REMEDIATION OF DISTRIBUTED SYSTEMS UPGRADES

(71) Applicant: VMware, Inc., Palo Alto, CA (US)

(72) Inventors: Ramses V. Morales, Palo Alto, CA (US); Alkesh Shah, Palo Alto, CA (US); Leonid Livshin, Boston, MA (US); Austin Kramer, Palo Alto, CA (US); Nitin Nagaraja, Palo Alto, CA (US); Brian Masao Oki, Palo Alto, CA (US); Sunil Vajir, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/384,202

(22) Filed: Jul. 23, 2021

(65) Prior Publication Data
US 2023/0029943 A1   Feb. 2, 2023

(51) Int. Cl.
G06F 11/00 (2006.01)
G06F 11/30 (2006.01)
G06F 8/656 (2018.01)
G06F 11/07 (2006.01)

(52) U.S. Cl.
CPC .......... G06F 11/3006 (2013.01); G06F 8/656 (2018.02); G06F 11/0772 (2013.01); G06F 11/0793 (2013.01)

(58) Field of Classification Search
CPC ............. G06F 11/0709; G06F 11/3006; G06F 11/3055; G06F 11/0751; G06F 11/0793; G06F 11/076; G06F 11/3065
See application file for complete search history.

(56) References Cited

U.S. PATENT DOCUMENTS

| | | | |
|---|---|---|---|
| 9,148,465 B2 | 9/2015 | Gambardella et al. | |
| 10,042,628 B2 | 8/2018 | Olmstedthompson | |
| 10,133,619 B1 * | 11/2018 | Nagpal | G06F 11/079 |
| 10,142,204 B2 | 11/2018 | Nickolov et al. | |
| 2006/0048017 A1 | 3/2006 | Anerousis et al. | |
| 2006/0184930 A1 | 8/2006 | Fuente et al. | |
| 2011/0099266 A1 | 4/2011 | Calder et al. | |
| 2011/0107135 A1 | 5/2011 | Andrews et al. | |
| 2017/0115978 A1 * | 4/2017 | Modi | G06F 8/65 |
| 2022/0247812 A1 * | 8/2022 | Mehta | H04L 67/1097 |

* cited by examiner

*Primary Examiner* — Charles Ehne

(57) ABSTRACT

The present disclosure relates to health measurement and remediation of distributed systems upgrades. One method includes communicating a request for a health status to a cluster store provided by a cluster of hosts of a software-defined datacenter, wherein the cluster store includes a plurality of process instances undergoing a rolling upgrade, receiving a health status indication in response to the request, the health status indication determined based on a determination of whether the cluster store is available and a determination of whether the cluster store is operational, and taking a remediation action in response to the health status indication exceeding a threshold.

19 Claims, 3 Drawing Sheets

HEALTH MEASUREMENT AND REMEDIATION OF DISTRIBUTED SYSTEMS UPGRADES

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may utilize data storage and/or data processing services from the provider in order to run applications that handle the enterprises' core business and operational data. The applications may be proprietary and used exclusively by the enterprise or made available through a network for anyone to access and use.

Virtual computing instances (VCIs), such as virtual machines and containers, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a distributed system, such as a software-defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

Distributed systems may undergo upgrades to their software. In contemporary data centers, availability, automation, and data durability during upgrades are highly valued.

DETAILED DESCRIPTION

Figure 1:
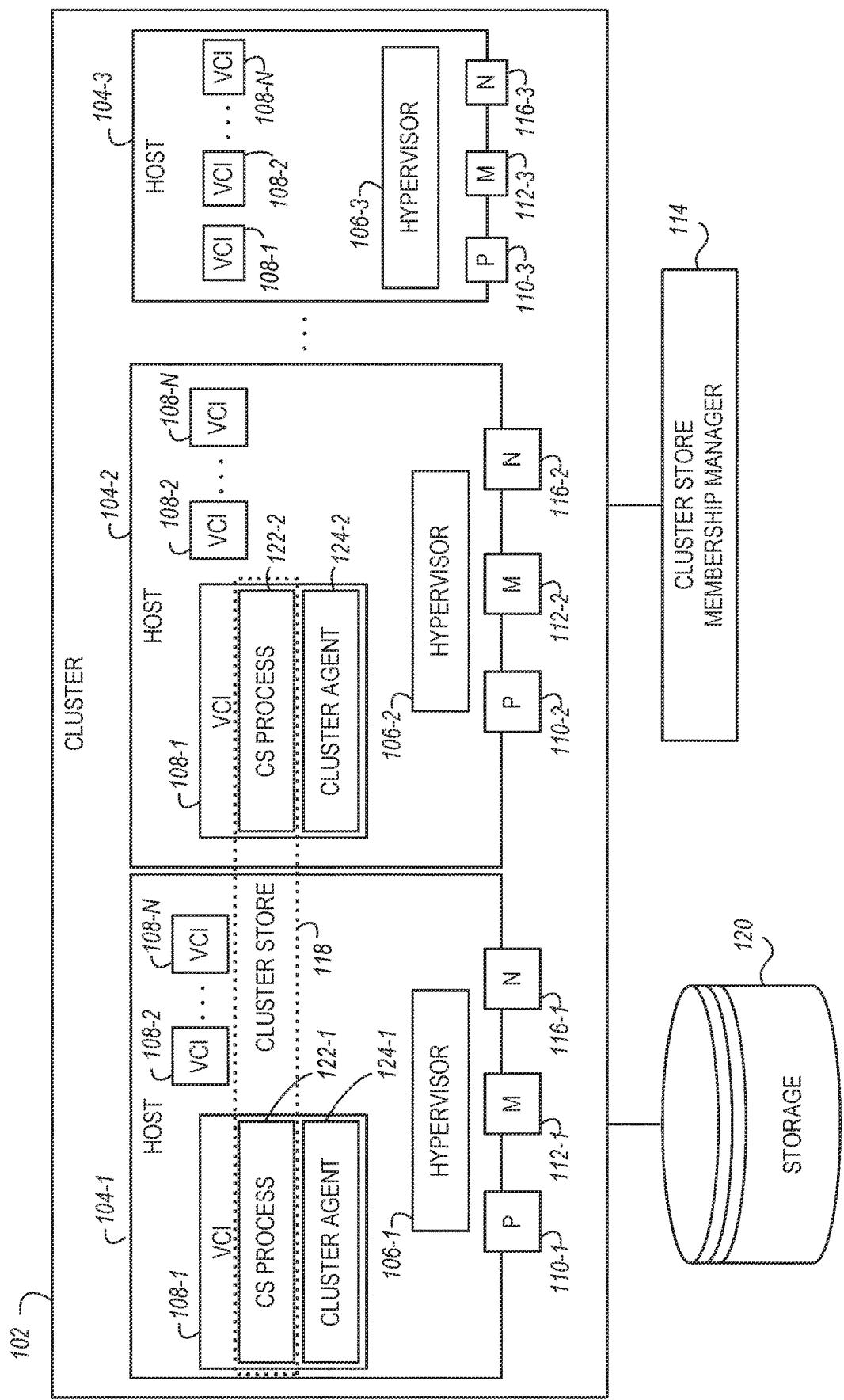
FIG. 1 is a diagram of a cluster and a system for health measurement and remediation of distributed systems upgrades according to one or more embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes. Where a process, for instance, is discussed herein as being executed by a VCI, it is to be understood that such discussion is made for purposes of illustration and embodiments of the present disclosure are not so limited.

Distributed systems, such as software-defined data centers (SDDCs), may undergo upgrades to their software. In contemporary data centers, availability, automation, and data durability during upgrades is desired. In distributed systems a rolling upgrade process can be implemented to reduce downtime and service disruption. However, SDDCs typically contain open source components used to instantiate a single process, which makes supporting different software versions difficult. Additionally, it may be difficult to operate the system such that it is available enough to achieve consensus during a rolling upgrade.

Embodiments of the present disclosure include a cluster store that provides consistency and can be health checked while an upgrade is ongoing. A cluster store, as referred to herein, is a distributed system that allows reading and writing data in a consistent manner. As described further below, a SDDC can include a number of clusters. A cluster is a group of hosts. A cluster manages the resources of all hosts within it. A cluster store in accordance with embodiments of the present disclosure is a distributed system provided by a cluster and can handle metadata for the cluster. Such metadata can include, for instance, membership information of the cluster (e.g., which hosts comprise the cluster). A cluster store includes processes. Each host of a cluster can contain (e.g., execute) one instance of a process (sometimes referred to herein as a "process instance") of the cluster store. Cluster store process instances can answer read requests and/or write requests. In some embodiments, less than all hosts of a cluster can contain a process instance of the cluster store. The set of cluster store process instances may be referred to as "cluster store membership" and can range from one host to the total number of hosts in a data center.

A rolling upgrade includes upgrading the version of each process instance of the cluster store and each host of the cluster. Stated differently, a rolling upgrade can include updating the bits of each instance of a cluster store's processes from version "V−1" to version "V" and updating the image (including the binary of the cluster store) of the hosts comprising the cluster. In some embodiments, for instance, a particular process instance (or a particular host) can be shut down, upgraded, and then restarted. This process can continue with each process instance and each host one-by-one, until all process instances and hosts are upgraded. However, rolling upgrades may face issues including, but not limited to, errors, corrupted data, and/or power failures. Embodiments herein address these issues using a health check that allows a rolling upgrade to the processes of a cluster store while maintaining compatibility between software versions and endeavoring to maintain availability and operability of the cluster store.

A cluster store can be said to be "available" when a cluster store client (e.g., a VCI) can perform read and write operations. A cluster store can be said to be available when it has quorum to achieve distributed consensus. As known to those of skill in the art, quorum refers to the number (e.g., minimum number) of votes that a distributed transaction has to obtain in order to be allowed to perform an operation in a distributed system. Also, a cluster store can be said to be available when a fault tolerance threshold has not been exceeded, and unavailable when the fault tolerance threshold has been exceeded. In an example cluster store having three process instances, the fault tolerance threshold may be one (e.g., wherein two instances are needed for availability).

Health checks in accordance with the present disclosure can reduce the loss of availability of the cluster store during a rolling upgrade. As described further below, a periodic request can be sent to a cluster agent that interacts with the cluster store. The cluster agent can forward the request to each process instance, which can determine whether consensus can be achieved (e.g., whether quorum exists) and whether any problems exist that cannot be solved automatically (e.g., without user intervention). A health status can be indicated, and, based on the health status, embodiments herein can take a number of remediation actions. In some embodiments, a remediation action includes stopping a rolling upgrade and solving the problem. In some embodiments, a remediation action includes stopping a rolling upgrade until a user intervenes to solve the problem.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Analogous elements within a Figure may be referenced with a hyphen and extra numeral or letter. Such analogous elements may be generally referenced without the hyphen and extra numeral or letter. For example, elements 108-1, 108-2, and 108-N in FIG. 1 may be collectively referenced as 108. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a diagram of a cluster and a system for health measurement and remediation of distributed systems upgrades according to one or more embodiments of the present disclosure. The system can include a cluster 102 in communication with a cluster store membership manager (CSMM) 114 and storage 120. Though a single cluster is illustrated in FIG. 1 for purposes of illustration, embodiments of the present disclosure are not limited to a particular number of clusters. The cluster 102 can include a first host 104-1 with processing resources 110-1 (e.g., a number of processors), memory resources 112-1, and/or a network interface 116-1. The cluster 102 can include a second host 104-2 with processing resources 110-2, memory resources 112-2, and/or a network interface 116-2. The cluster 102 can include a third host 104-3 with processing resources 110-3, memory resources 112-3, and/or a network interface 116-3. Though three hosts are shown in FIG. 1 for purposes of illustration, embodiments of the present disclosure are not limited to a particular number of hosts. For purposes of clarity, the first host 104-1, the second host 104-2, and/or the third host 104-3 (and/or additional hosts not illustrated in FIG. 1) may be generally referred to as "host 104." Similarly, reference is made to "hypervisor 106," "VCI 108," "processing resources 110," memory resources 112," "network interface 116," etc., and such usage is not to be taken in a limiting sense.

The host 104 can be included in a software-defined data center. A software-defined data center can extend virtualization concepts such as abstraction, pooling, and automation to data center resources and services to provide information technology as a service (ITaaS). In a software-defined data center, infrastructure, such as networking, processing, and security, can be virtualized and delivered as a service. A software-defined data center can include software-defined networking and/or software-defined storage. In some embodiments, components of a software-defined data center can be provisioned, operated, and/or managed through an application programming interface (API).

The host 104 can incorporate a hypervisor 106 that can execute a number of VCIs 108-1, 108-2, . . . , 108-N (referred to generally herein as "VCIs 108"). The VCIs 108 can be provisioned with processing resources 110 and/or memory resources 112 and can communicate via the network interface 116. The processing resources 110 and the memory resources 112 provisioned to the VCIs 108 can be local and/or remote to the host 104. For example, in a software-defined data center, the VCIs 108 can be provisioned with resources that are generally available to the software-defined data center and not tied to any particular hardware device. By way of example, the memory resources 112 can include volatile and/or non-volatile memory available to the VCIs 108. The VCIs 108 can be moved to different hosts (not specifically illustrated), such that a different hypervisor manages (e.g., executes) the VCIs 108. The host 104 can be in communication with the CSMM 114. In some embodiments, the CSMM 114 can be deployed on a server, such as a web server. In some embodiments, the CSMM can be a process in a host. In some embodiments, the CSMM can be a distributed system running in the hosts 104.

The CSMM 114 can include computing resources (e.g., processing resources and/or memory resources in the form of hardware, circuitry, and/or logic, etc.) to perform various operations to perform health monitoring. In some embodiments, the CSMM 114 can be part of a cluster controller (e.g., a vSAN cluster manager). In some embodiments, the local disks of the hosts 104 can act as pooled storage for the cluster 102 (e.g., storage 120) that can store data corresponding to the VCIs 108-1, . . . , 108-N.

The cluster 102 includes a cluster store 118. The cluster store 118 is a distributed system that allows reading and writing data in a consistent manner. The cluster 118 manages the resources of the hosts 104. As previously discussed, the cluster store 118 includes processes. As shown in FIG. 1, the cluster store 118 can be considered as a set of cluster store process instances 122. For instance, as shown in the example illustrated in FIG. 1, the VCI 108-1 can execute a cluster store process instance 122-1, and the VCI 108-2 can execute a cluster store process instance 122-2. The cluster store process instance 122-1 and the the cluster store process instance 122-2 can work together to provide the cluster store 118. It is noted that while the process instances 122 are shown as being executed by VCIs 108, embodiments herein are not so limited.

Embodiments here can implement a replicated state machine and each process instance 122 can include a replica of that state machine, thereby allowing replication of the data of the cluster store 118. A "replica" refers to the data stored by a single cluster store process instance 122. The cluster store process instances 122 can answer read requests and/or write requests. In some embodiments, less than all hosts 104 of the cluster 102 contain a process instance 122 of the cluster store 118. The set of cluster store process instances 122 may be referred to as "cluster store membership" and can range from one host to the total number of hosts in a data center. For instance, as shown in the example illustrated in FIG. 1, the membership of the cluster store 118 includes the host 104-1 and the host 104-2, as the host 104-3 is not shown as executing a cluster store process instance.

The host 104-1 and the host 104-2 each include a cluster agent 124. The cluster agent 124 interacts with the cluster store 118 and controls the configuration and execution of each cluster store process instance 122. Additionally, the cluster agent 124 can be an intermediary between the CSMM 114 and the cluster store 118. In some embodiments, the cluster store 118 and the cluster agent 124 are proprietary, while at least a portion of the software-defined datacenter is open source.

The CSMM 114 can monitor the health of the cluster store 118 by querying the cluster agent 124 (e.g., one or more of the cluster agents 124). If the cluster store is not healthy (e.g., not available and/or operational), the CSMM 114 can attempt remediation. Health monitoring in accordance with the present disclosure can be performed at the same time that a rolling upgrade is taking place. Remediation in accordance with embodiments herein may tend to place emphasis on the upgrade of the hosts 104 rather than the availability of the cluster store 118. The CSMM 114 may be aware of the ongoing upgrade because it is aware of the version of the hosts 104.

In some embodiments, the cluster store 118 implements a health check application programming interface (API), which can be used by the cluster agent 124. In addition, the cluster agent 124 can implement a cluster store health endpoint for the CSMM 114 and may make decisions regarding the health of the cluster store 118. For example, the cluster agent 124 may be notified if a cluster store process instance 122 stops unexpectedly. In some embodiments, the API is defined and implemented in the cluster agent 124 and the CSMM 114 implements a client of the API. Pseudocode associated with the API can include:

```
type HealthColor string
   const (
      HealthGreen HealthColor = "green" // all is fine
      HealthYellow = "yellow"    // Cannot determine if transient problem
or persistent problem
      HealthRed = "red"            // Persistent problem
   )
   type HealthRequest struct { }
   type HealthResponse struct {
      Color HealthColor   // Color coding of the HealthError severity.
      HealthDescription string // Will have a message if the cluster store is
not healthy.
      Error string   // Would be used to signal a request error unrelated to
the health request.
   }
```

The CSMM 114 can periodically start an internal thread to perform the health monitoring request. In some embodiments, for instance, the CSMM 114 periodically send a health request to each cluster agent 124 in front of each replica (e.g., cluster store process instance 122) and the cluster agent 124 forwards that request to its cluster store replica. The cluster store 118 can implement a health function that takes as input at least two aspects of the cluster store. One, whether the cluster store is available (e.g., whether consensus can be achieved), and two, whether the cluster store is operational (e.g., whether the cluster store cannot be recovered autonomously). Corruption of persisted data, for instance, would be a problem that could not be recovered autonomously and would require user intervention. Such a problem would return a "HealthRed" indication. Alternatively, lack of consensus would result in a "HealthYellow." Otherwise, if there are no issues with availability or operability, "HealthGreen" is returned.

Such a health check can be extended to map other inputs to the general health outputs. In general, green means that the cluster store 118 is available; yellow means that a transient issue has been found such as lack of consensus, for instance; red means that a permanent failure that cannot automatically (e.g., without user input) be recovered, has happened. In some embodiments, if the cluster agent 124 cannot contact the cluster store 118, the cluster agent 124 can provide the indication. The CSMM 114 can aggregate all the results it receives in the current round.

If the cluster store 118 is being upgraded, the CSMM 114 can temporarily stop the upgrade if the indication is "yellow." In such cases, the CSMM 114 can initiate an automatic remediation mechanism, derived from the reason behind the "yellow" status. For instance, if consensus has not been achieved because there is no leader, the CSMM 114 can wait until a new leader is elected in the cluster store 118. If the cluster store 118 is being upgraded and the indication is "red" the CSMM 114 waits for the issue to be remediated before allowing the upgrade to continue. For instance, if one replica is corrupt, the CSMM 114 can repair that replica by removing it and recreating that cluster store's node.

If, after multiple attempts at remediation, the rolling upgrade fails to proceed, embodiments herein can roll back the upgrade. Rollback, as referred to herein, is changing the bits of each instance of a cluster store's processes from version "V" to version "V−1." If at most N−1 members have been upgraded to the latest version, rollback involves members restarting with the previous version without affecting availability. The data in the cluster store 118 is not affected by rolling back an upgrade.

Figure 2:
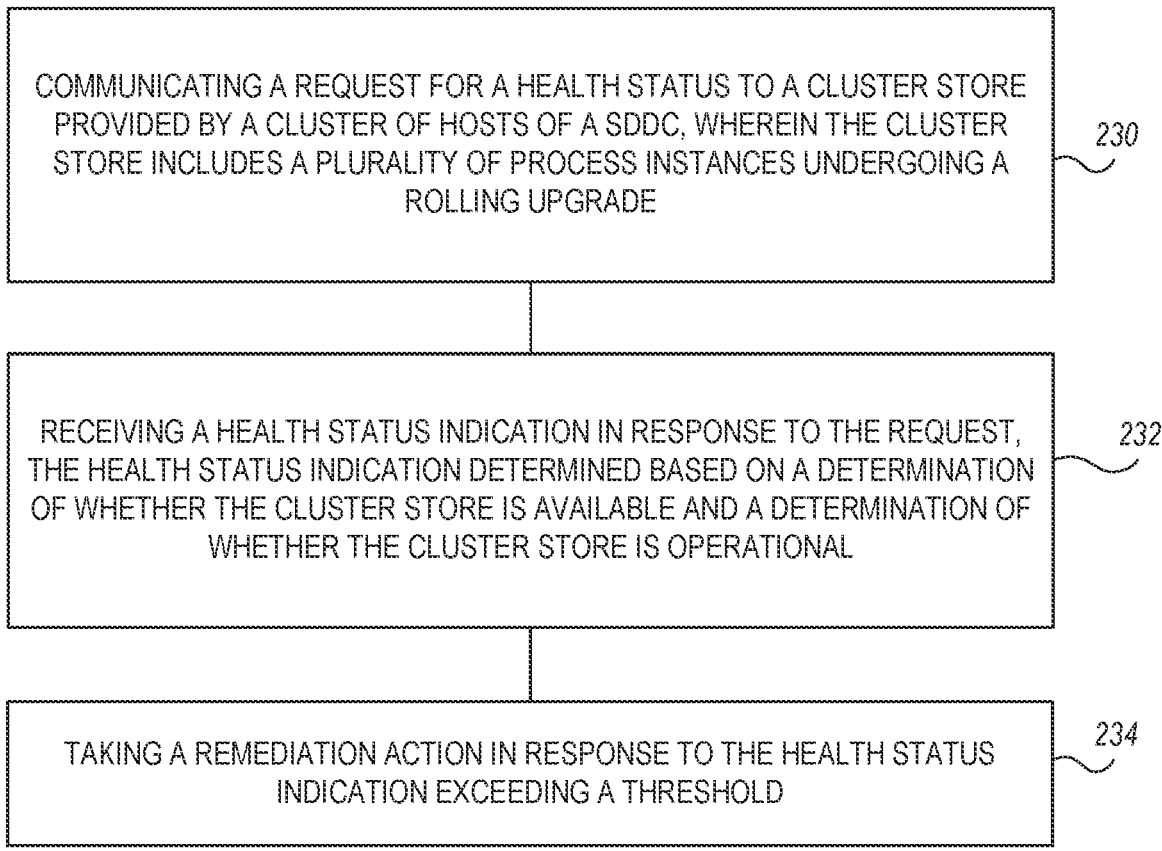
FIG. 2 illustrates a method for health measurement and remediation of distributed systems upgrades according to one or more embodiments of the present disclosure.

FIG. 2 illustrates a method for health measurement and remediation of distributed systems upgrades according to one or more embodiments of the present disclosure. At 230, the method includes communicating a request for a health status to a cluster store provided by a cluster of hosts of a software-defined datacenter, wherein the cluster store includes a plurality of process instances undergoing a rolling upgrade.

At 232, the method includes receiving a health status indication in response to the request, the health status indication determined based on a determination of whether the cluster store is available and a determination of whether the cluster store is operational. In some embodiments, determining whether the cluster store is available includes determining a number of the plurality of process instances that are functioning.

At 234, the method includes taking a remediation action in response to the health status indication exceeding a threshold. In some embodiments, the health status exceeds the threshold if the cluster store is unavailable or the cluster store is nonoperational. Remedial action, as previously discussed, can include stopping the upgrade. In some embodiments the upgrade can be resumed responsive to the cluster store becoming available following the automatic remediation mechanism. In some embodiments the upgrade can be resumed responsive to a user having rendered the cluster store operational. In some embodiments where remediation has been unsuccessful, the upgrade is rolled back.

Figure 3:
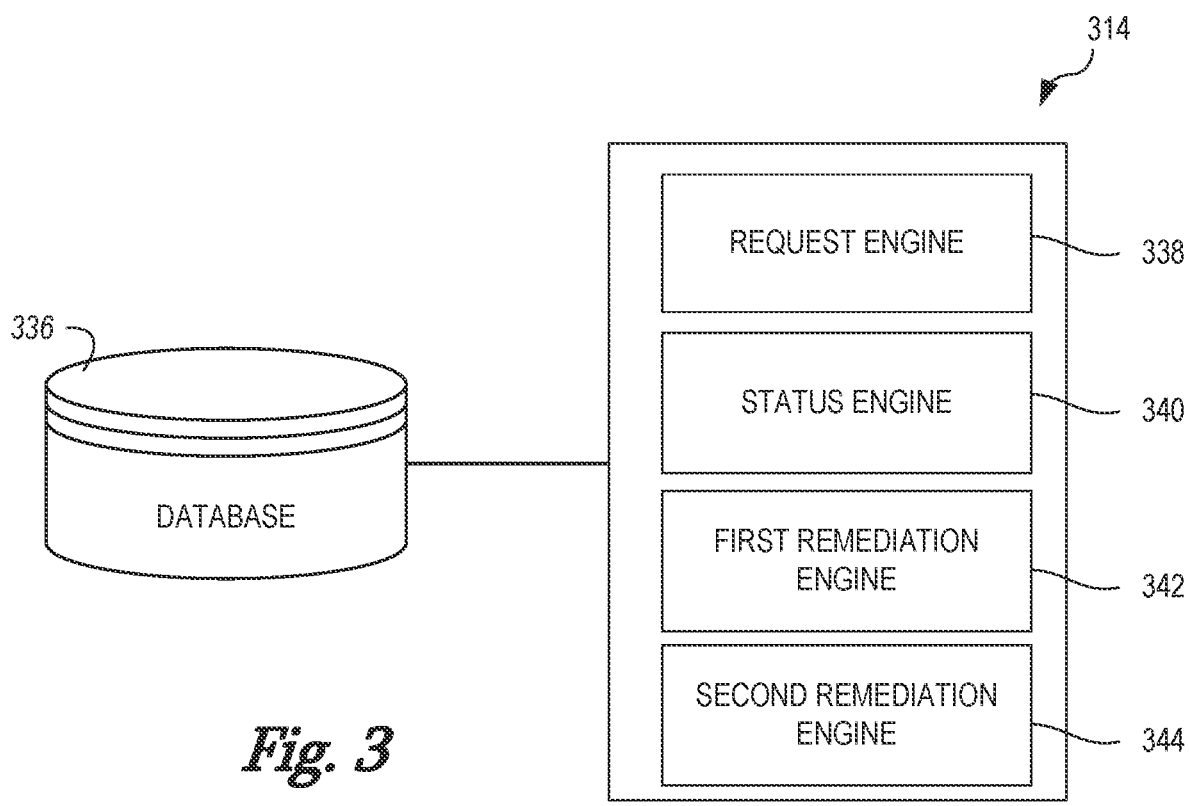
FIG. 3 is a diagram of a system for health measurement and remediation of distributed systems upgrades according to one or more embodiments of the present disclosure.

FIG. 3 is a diagram of a system 314 for health measurement and remediation of distributed systems upgrades according to one or more embodiments of the present disclosure. The system 314 can include a database 336 and/or a number of engines, for example request 338, status engine 340, first remediation engine 342 and/or second remediation engine 344, and can be in communication with the database 336 via a communication link. The system 314 can include additional or fewer engines than illustrated to perform the various functions described herein. The system can represent program instructions and/or hardware of a machine (e.g., machine 446 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the request engine 338 can include a combination of hardware and program instructions that is configured to communicate a request for a health status to a cluster store of a software-defined datacenter, the cluster store provided by a cluster of hosts, wherein the cluster store includes a plurality of process instances undergoing a rolling upgrade. The request can be communicated periodically. In some embodiments, the request is communicated according to a particular frequency that is exceeded by an amount of time for one of the plurality of process instances to be upgraded. In some embodiments, the status engine 340 can include a combination of hardware and program instructions that is configured to receive a health status indication in response to the request. The health status indication can be a first health status indication responsive to a determination that the cluster store is available and persisted data of the cluster store is not corrupt. The health status indication can be a second health status indication responsive to a determination that the cluster store is not available and persisted data of the cluster store is not corrupt. The health status indication can be a third health status indication responsive to a determination that the cluster store is nonoperational. In some embodiments, the first remediation engine 342 can include a combination of hardware and program instructions that is configured to take a first remediation action in response to receiving the second health status indication. In some embodiments, the second remediation engine 344 can include a combination of hardware and program instructions that is configured to take a second remediation action in response to receiving the third health status indication. Although not shown in FIG. 3, the system 314 can include a rollback engine configured to roll back an upgrade to one of the plurality of process instances undergoing the rolling upgrade responsive to a determination that the second remediation action failed.

Figure 4:
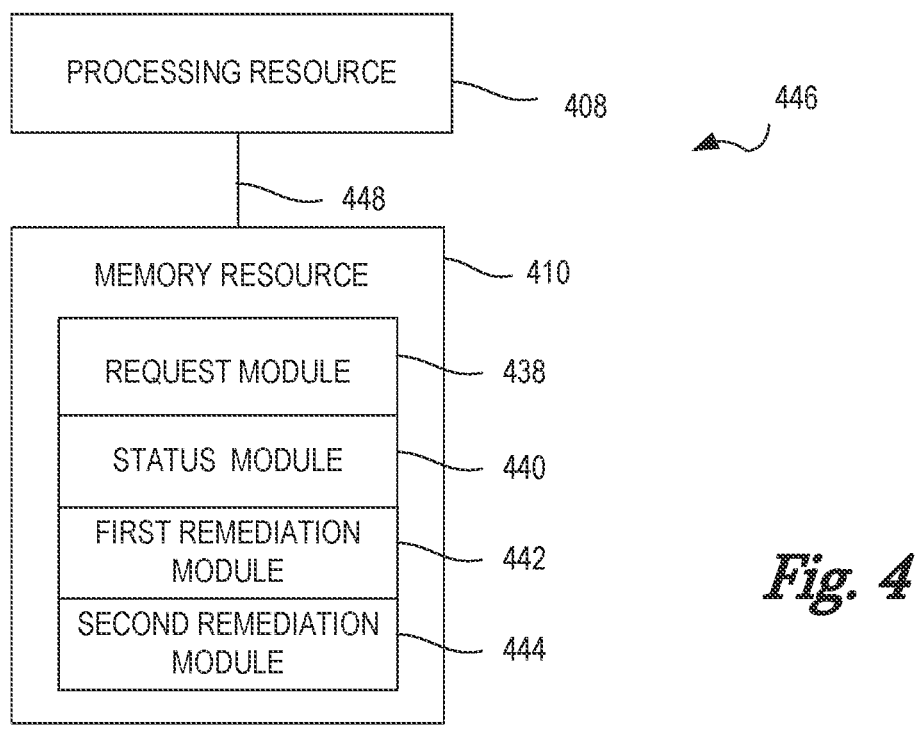
FIG. 4 is a diagram of a machine for health measurement and remediation of distributed systems upgrades according to one or more embodiments of the present disclosure.

FIG. 4 is a diagram of a machine for health measurement and remediation of distributed systems upgrades according to one or more embodiments of the present disclosure. The machine 446 can utilize software, hardware, firmware, and/or logic to perform a number of functions. The machine 446 can be a combination of hardware and program instructions configured to perform a number of functions (e.g., actions). The hardware, for example, can include a number of processing resources 408 and a number of memory resources 410, such as a machine-readable medium (MRM) or other memory resources 410. The memory resources 410 can be internal and/or external to the machine 446 (e.g., the machine 446 can include internal memory resources and have access to external memory resources). In some embodiments, the machine 446 can be a VCI. The program instructions (e.g., machine-readable instructions (MRI)) can include instructions stored on the MRM to implement a particular function (e.g., an action such as taking a remedial action, as described herein). The set of MRI can be executable by one or more of the processing resources 408. The memory resources 410 can be coupled to the machine 446 in a wired and/or wireless manner. For example, the memory resources 410 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

Memory resources 410 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 408 can be coupled to the memory resources 410 via a communication path 448. The communication path 448 can be local or remote to the machine 446. Examples of a local communication path 448 can include an electronic bus internal to a machine, where the memory resources 410 are in communication with the processing resources 408 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 448 can be such that the memory resources 410 are remote from the processing resources 408, such as in a network connection between the memory resources 410 and the processing resources 408. That is, the communication path 448 can be a network connection. Examples of such a network connection can include a local area network (LAN), wide area network (WAN), personal area network (PAN), and the Internet, among others.

As shown in FIG. 4, the MRI stored in the memory resources 410 can be segmented into a number of modules 438, 440, 442, 444 that when executed by the processing resources 408 can perform a number of functions. As used herein a module includes a set of instructions included to perform a particular task or action. The number of modules 438, 440, 442, 444 can be sub-modules of other modules. For example, the second remediation module 444 can be a sub-module of the first remediation module 442 and/or can be contained within a single module. Furthermore, the number of modules 438, 440, 442, 444 can comprise individual modules separate and distinct from one another. Examples are not limited to the specific modules 438, 440, 442, 444 illustrated in FIG. 4.

Each of the number of modules 438, 440, 442, 444 can include program instructions and/or a combination of hardware and program instructions that, when executed by a processing resource 408, can function as a corresponding engine as described with respect to FIG. 3. For example, the request module 438 can include program instructions and/or a combination of hardware and program instructions that, when executed by a processing resource 408, can function as the request engine 338, though embodiments of the present disclosure are not so limited.

The machine 446 can include a request module 438, which can include instructions to communicate a request for a health status to a cluster store of a software-defined datacenter, the cluster store provided by a cluster of hosts. The machine 446 can include a status module 440, which can include instructions to receive a health status indication in response to the request. The health status indication can be a first health status indication responsive to a determination that the cluster store is available and operational. The health status indication can be a second health status indication responsive to a determination that the cluster store is operational and not available. The health status indication can be a third health status indication responsive to a determination that the cluster store is nonoperational. The machine 446 can include a first remediation module 442, which can include instructions to take a first remediation action in response to receiving the second health status indication. The machine 446 can include a second remediation module 444, which can include instructions to take a second remediation action in response to receiving the third health status indication. In some embodiments, the machine 446 includes instructions to determine that the cluster store is available include instructions to determine that the cluster store comprises a quorum of process instances. In some embodiments, the machine 446 includes instructions to determine that the cluster store is not available include instructions to determine that the cluster store comprises fewer process instances than a quorum of process instances.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
communicating a request for a health status to a cluster store provided by a cluster of hosts of a software-defined datacenter, wherein the cluster store includes a plurality of process instances undergoing a rolling upgrade;
receiving a health status indication in response to the request, the health status indication determined based on:
a determination of whether the cluster store is available such that a client of the cluster store can perform read and write operations on the cluster store, wherein determining whether the cluster store is available includes determining whether the cluster store comprises a quorum of process instances to achieve distributed consensus; and
a determination of whether the cluster store is operational;
wherein the health status indication comprises one of:
a first health status indication responsive to a determination that the cluster store is available and operational;
a second health status indication responsive to a determination that the cluster store is operational and not available; and
a third health status indication responsive to a determination that the cluster store is nonoperational; and
taking a remediation action in response to the health status indication exceeding a threshold.

2. The method of claim 1, wherein the determination of whether the cluster store is available includes a determination of a number of the plurality of process instances that are functioning.

3. The method of claim 1, wherein the health status indication exceeding the threshold includes the cluster store being unavailable or the cluster store being nonoperational.

4. The method of claim 3, wherein taking the remedial action includes stopping the upgrade.

5. The method of claim 4, wherein the method includes resuming the upgrade responsive to the cluster store becoming available following the automatic remediation mechanism.

6. The method of claim 4, wherein the method includes stopping the upgrade until a determination that a user has rendered the cluster store operational.

7. The method of claim 4, wherein the method includes rolling back the upgrade responsive to a determination that the remediation action failed.

8. The method of claim 1, wherein communicating the request for the health status to the cluster store includes implementing a health check application programming interface (API) and communicating the request through a cluster agent via the API.

9. The method of claim 8, wherein the cluster store and the cluster agent are proprietary, and wherein at least a portion of the software-defined datacenter is open source.

10. A non-transitory machine-readable medium having instructions stored thereon which, when executed by a processor, cause the processor to:
communicate a request for a health status to a cluster store of a software-defined datacenter, the cluster store provided by a cluster of hosts;
receive a health status indication in response to the request, wherein the health status indication includes one of:
a first health status indication responsive to a determination that the cluster store is available and operational such that a client of the cluster store can perform read and write operations on the cluster store, wherein determining whether the cluster store is available includes determining whether the cluster store comprises a quorum of process instances to achieve distributed consensus;
a second health status indication responsive to a determination that the cluster store is operational and not available; and
a third health status indication responsive to a determination that the cluster store is nonoperational;
take a first remediation action in response to receiving the second health status indication; and
take a second remediation action in response to receiving the third health status indication.

11. The medium of claim 10, wherein the instructions to determine that the cluster store is not available include instructions to determine that the cluster store comprises fewer process instances than a quorum of process instances.

12. The medium of claim 10, wherein the instructions to take the first remediation action include instructions to temporarily stop an upgrade to the cluster store.

13. The medium of claim 12, wherein the instructions to take the first remediation action include instructions to:
initiate an automatic remediation mechanism; and
resume the upgrade to the cluster store responsive to the cluster store becoming available following the automatic remediation mechanism.

14. The medium of claim 10, wherein the instructions to determine that the cluster store is nonoperational include instructions to determine that the cluster store cannot be recovered autonomously.

15. A system, comprising:
a request engine configured to communicate a request for a health status to a cluster store of a software-defined datacenter, the cluster store provided by a cluster of hosts, wherein the cluster store includes a plurality of process instances undergoing a rolling upgrade;
a status engine configured to receive a health status indication in response to the request, wherein the health status indication includes one of:
a first health status indication responsive to a determination that the cluster store is available and persisted data of the cluster store is not corrupt such that a client of the cluster store can perform read and write operations on the cluster store, wherein determining whether the cluster store is available includes determining whether the cluster store comprises a quorum of process instances to achieve distributed consensus;
a second health status indication responsive to a determination that the cluster store is not available and persisted data of the cluster store is not corrupt; and
a third health status indication responsive to a determination that the cluster store is nonoperational;
a first remediation engine configured to take a first remediation action in response to receiving the second health status indication; and
a second remediation engine configured to take a second remediation action in response to receiving the third health status indication.

16. The system of claim 15, wherein the request engine is configured to communicate the request for the health status periodically.

17. The system of claim 15, wherein the request engine is configured to repeatedly communicate the request for the health status according to a particular frequency, and wherein the particular frequency is exceeded by an amount of time for one of the plurality of process instances to be upgraded.

18. The system of claim 15, wherein the status engine is configured to receive the third health status indication responsive to a determination that persisted data of the cluster store is corrupt.

19. The system of claim 15, including a rollback engine configured to roll back an upgrade to one of the plurality of process instances undergoing the rolling upgrade responsive to a determination that the second remediation action failed.

* * * * *